United States Patent
Tsapkolenko et al.

(10) Patent No.: US 12,241,743 B2
(45) Date of Patent: Mar. 4, 2025

(54) SENSOR SYSTEM AND METHOD FOR SECURING A SENSOR SYSTEM

(71) Applicant: Robert Bosch GmbH, Stuttgart (DE)

(72) Inventors: Alexander Tsapkolenko, Reutlingen (DE); Hartmut Ruf, Tuebingen (DE); Mirko Hofmann, Reutlingen (DE); Rolf Scheben, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 148 days.

(21) Appl. No.: 18/060,052

(22) Filed: Nov. 30, 2022

(65) Prior Publication Data
US 2023/0194262 A1 Jun. 22, 2023

(30) Foreign Application Priority Data
Dec. 22, 2021 (DE) .................. 10 2021 214 929.4

(51) Int. Cl.
*G01C 19/5712* (2012.01)
*G01C 19/5776* (2012.01)
*G01P 15/08* (2006.01)
*G01P 15/18* (2013.01)

(52) U.S. Cl.
CPC ..... *G01C 19/5712* (2013.01); *G01C 19/5776* (2013.01); *G01P 15/0891* (2013.01); *G01P 15/18* (2013.01)

(58) Field of Classification Search
CPC . G01C 19/5712; G01C 19/5776; G01P 15/18; G01P 15/0891; G01P 15/097; G01P 15/0802; G01P 1/00; G01P 1/04
See application file for complete search history.

(56) References Cited

U.S. PATENT DOCUMENTS

| | | | |
|---|---|---|---|
| 7,450,332 B2 | 11/2008 | Pasolini et al. | |
| 2006/0236761 A1* | 10/2006 | Inoue | G01P 15/0891 |
| 2009/0007661 A1* | 1/2009 | Nasiri | G01P 1/023 |
| | | | 73/504.03 |
| 2009/0240462 A1* | 9/2009 | Lee | G01P 15/0891 |
| | | | 702/141 |
| 2011/0146403 A1* | 6/2011 | Rizzo Piazza Roncoroni ............ |
| | | | H03B 5/30 |
| | | | 73/504.12 |
| 2011/0215940 A1* | 9/2011 | Bartholomeyczik | ........................ |
| | | | G01P 15/0891 |
| | | | 340/669 |
| 2011/0277532 A1* | 11/2011 | Bartholomeyczik ... | G01P 21/00 |
| | | | 73/1.38 |

(Continued)

FOREIGN PATENT DOCUMENTS

| | | |
|---|---|---|
| DE | 102010002656 A1 | 9/2011 |
| DE | 102020214034 A1 | 5/2022 |

*Primary Examiner* — Helen C Kwok
(74) *Attorney, Agent, or Firm* — NORTON ROSE FULBRIGHT US LLP; Gerard A. Messina

(57) ABSTRACT

A sensor system. The sensor system includes a rotation rate sensor and a control unit, the rotation rate sensor including a seismic mass and being configured to drive a movement of the seismic mass with the aid of a driving force, the control unit being configured to detect a free fall of the sensor system and to deactivate the driving force in the event of a detection of the free fall. A method for securing a sensor system, in a detection step a free fall of the sensor system being detected by the control unit, and in a securing step the driving force being deactivated by the control unit, is also described.

10 Claims, 4 Drawing Sheets

(56) References Cited

U.S. PATENT DOCUMENTS

| | | | | |
|---|---|---|---|---|
| 2015/0323560 A1* | 11/2015 | Castellano | ............ | G01P 15/125 |
| | | | | 702/86 |
| 2016/0379743 A1* | 12/2016 | Sirimamilla | ...... | H04M 1/72454 |
| | | | | 361/679.01 |
| 2018/0188028 A1* | 7/2018 | Jeong | ................. | G01C 19/5712 |
| 2023/0086000 A1* | 3/2023 | Schnee | ................... | G01P 13/00 |

\* cited by examiner

SENSOR SYSTEM AND METHOD FOR SECURING A SENSOR SYSTEM

CROSS REFERENCE

The present application claims the benefit under 35 U.S.C. § 119 of German Patent Application No. DE 10 2021 214 929.4 filed on Dec. 22, 2021, which is expressly incorporated herein by reference in its entirety.

FIELD

The present invention is directed to a sensor system and to a method for securing a sensor system.

BACKGROUND INFORMATION

Microelectromechanical inertial sensors for detecting rotary movements or accelerations are described in the related art in various specific embodiments. The application spectrum encompasses, for example, the areas of consumer and entertainment electronics, industrial applications, and the automotive field. The detection principle of such sensors is based on the basic principle of measuring the inertial forces caused by a movement of the sensor on a movably mounted seismic mass, and of determining the present acceleration or rotation rate therefrom. The movability of the seismic structure results in a fundamental sensitivity with respect to strong mechanical shocks and vibrations, as they arise, in particular, upon the impact of a falling sensor. In the case of such a mechanical shock, the seismic mass may, for example, be deflected in an uncontrolled manner and strike against the surrounding structure, so that the sensor may become damaged or be impaired in its functional capability. The robustness of sensor systems may be ascertained by testing methods such as drop tests, tumbler tests or repetitive shock tests and is subject to steadily rising requirements in the various fields of application.

In the case of rotation rate sensors, a particularly critical situation arises in this regard since here the seismic mass for the measurement of the Coriolis force must be actively kept in motion. The superimposition of an external shock and the high-frequency excitation movement results in higher striking energies, changed strike angles and/or the risk of material being removed due to the strike. In the process, chipping of the structure may arise, or an increased abrasion caused by the strikes, which, in turn, results in an increased particle load in the sensor core.

The drive of a rotation rate sensor is frequently implemented via a comb-shaped electrode array (drive comb), in which a comb electrode connected to the seismic mass engages, without contact, with a comb electrode fixed to a substrate. In the case of a mechanical shock, the drive comb is strongly deflected and may interlock or jam with the opposing comb and, in this way, may be at least temporarily impaired in its function.

Various measures for the protection against impact damage are described in the related art for other technical contexts. For example, a protective mechanism for hard disk heads in mobile processors is described in German Patent Application No. DE 10 2010 002 656 A1. In the process, a free fall is recognized by an acceleration sensor integrated into the device, and the read head of the hard disk is moved into a secure position so that it does not come in contact with the magnetic disk as a result of the vibration, and a so-called crash of the hard disk is prevented.

SUMMARY

It is an object of the present invention to provide a sensor system by which a snagging or damage of the rotation rate sensor during impact may be prevented.

Compared to the related art, the sensor system according to the present invention allows the excitation of the seismic mass to be interrupted during a fall of the sensor system, and thereby the risk of damage or a mechanical blockage to be reduced.

The sensor system according to an example embodiment of the present invention includes at least one rotation rate sensor including a deflectable seismic mass. In addition, the sensor system may include further sensors, in particular, inertial sensors, such as, for example, one or multiple acceleration sensor(s) or additional rotation rate sensors. The inertial sensor or sensors is/are, in particular, formed by microelectromechanical system (MEMS) structures. The sensor system is preferably an inertial measuring unit (IMU). The seismic mass is, in particular, able to be driven to carry out a drive oscillation, the driving force preferably being generated by an electrode array, particularly preferably by one or multiple comb electrode(s). The electrode array is configured to generate an alternating electrostatic field, which acts as a driving force on the seismic mass and causes it to oscillate, when a temporally periodic electrode voltage is present. During a rotation of the sensor, a Coriolis acceleration acts on the oscillating mass, which causes a detection oscillation extending perpendicularly to the drive oscillation, via the amplitude of which the present rotation rate may be determined. The drive oscillation may, for example, be controlled via a control loop, which controls the voltage present at the electrode array in such a way that a temporally constant amplitude of the drive oscillation arises.

The sensor system furthermore includes a control unit, which may be formed, for example, by an application-specific integrated circuit (ASIC) or also by a microcontroller or an application processor. According to the present invention, the control unit is configured to detect a free fall of the sensor system. The detection of the free fall may take place with the aid of a measuring signal of a sensor, in particular, of an acceleration sensor, a pressure sensor and/or an optical sensor of the sensor system. For example, the detection may take place based on a comparison of the measuring signal to one or multiple threshold value(s) or by a similar criterion. In particular, the control unit is configured to continuously monitor the sensor system for a free fall during the sensor operation. In the event of a detection of the free fall, the driving force is deactivated by the control unit, in particular, by shutting off the voltage present at the electrode array. The control unit is preferably configured to re-activate the driving force when no free fall is detected any longer, and thus no increased risk of damage due to impact exists any longer.

Advantageous embodiments and refinements of the present invention may be derived from the disclosure herein.

According to one preferred specific embodiment of the present invention, the control unit is configured to actively inhibit the movement of the seismic mass in the event of a detection of the free fall. The rigid structure of the rotation rate sensor already comes to a halt within a short time (<40 ms) without such an active deceleration, so that it may be ensured, for example, during a fall from a critical height (>1 m) that no superimposition of the external shock with the drive motion may occur. The settling of the seismic mass may additionally be shortened by an active deceleration process. The inhibiting force action required for this purpose may, for example, be generated via an electrostatic field formed by an electrode array.

According to one preferred specific embodiment of the present invention, it is provided that the sensor system includes an acceleration sensor, in particular, a three-axis acceleration sensor, and the control unit is configured to detect the free fall of the sensor system as a function of a measuring signal of the acceleration sensor. In particular, the free fall may be detected by a drop in the measured acceleration values, for example, in that a drop below a critical acceleration value is used as a criterion.

According to one preferred specific embodiment of the present invention, the sensor system is an inertial measuring unit (IMU), and the control unit is formed by an application-specific integrated circuit (ASIC) of the inertial measuring unit. In particular, the IMU includes at least one acceleration sensor, in addition to the rotation rate sensor, the control unit being connected both to the rotation rate sensor and to the acceleration sensor, and the free fall being detected via a monitoring of the acceleration signal. In this case, the rotation rate sensor may be deactivated directly at the IMU level, i.e., the module level, to reduce the effect of the impact and of the mechanical shock associated therewith on the sensor core. At the level of the overall system (encompassing the IMU), no further measures are therefore necessary. The probability of particles being released due to abrasion and parts of the micromechanics chipping may thus be considerably reduced. The rotation rate sensor, and thus the entire IMU, in this way withstands considerably higher requirements, and the potential field of use is thus considerably expanded. Moreover, this does not result in any practical disadvantages for the use due to the fact that, in the event of a fall, the rotation rate signal is at least temporarily no longer available.

According to one preferred specific embodiment of the present invention, the control unit is configured to detect the free fall of the sensor system as a function of the measuring signal of the acceleration sensor and a measuring signal of the rotation rate sensor. As a result of a combined evaluation of the acceleration signal and of the rotation rate signal, it is possible, for example, to detect a situation in which the sensor system is caused to rotate while falling, so that the reliability of the fall detection is further improved.

According to one preferred specific embodiment of the present invention, the rotation rate sensor includes an electrode array for generating the driving force, the electrode array additionally being configured to generate a force for inhibiting the movement of the seismic mass. In this way, both the drive action and the deceleration action for the seismic mass are generated by an electrode array, so that both functions may be implemented by a single structure.

The object mentioned at the outset may furthermore achieved by a method according to the present invention. The design options and advantages of the sensor system according to the present invention may be applied directly to the securing method according to the present invention, and vice versa. In particular, the sensor system according to the present invention is configured to carry out the method according to the present invention.

According to one specific example embodiment of the method according to the present invention, the sensor system includes an acceleration sensor, in particular a three-axis acceleration sensor, and the free fall of the sensor system is detected as a function of a measuring signal of the acceleration sensor.

According to one preferred specific embodiment, an acceleration measured by the acceleration sensor is continuously compared to at least one threshold value, and the free fall is detected by a drop below the threshold value. In particular, for this purpose, an absolute value of the acceleration vector is formed from the accelerations along three spatial axes, and its value is compared to the threshold value. As an alternative, it is also possible for three threshold values for the accelerations along the three axes to be predefined.

The driving force is preferably re-activated in a reactivation step following the securing step. In particular, the reactivation takes place after a predefined time period or when the criterion for the fall recognition (for example a drop below a threshold value) is no longer met.

The sensor system according to the present invention and/or the method according to the present invention may be used in connection with smart phones and tablets, wearables, hearables, AR and VR, drones, gaming and toys, robots, a smart home, and in the industrial context for the following applications: wake-up functions for select device modules, recognition of the device orientation, screen orientation and display orientation, recognition of a significant movement, shock and free fall recognition; human machine interface (HMI) functionality, for example multi-tap recognition, activity, gesture and context recognition, user recognition; movement control, Cardan system, altitude and attitude stabilization, flight control, image stabilization, interior and exterior navigation, floor recognition, position tracking and route recording, pedestrian dead reckoning (PDR), dynamic route planning, recognition of boundaries and obstacles, indoor simultaneous localization and mapping (SLAM); burglary monitoring, real-time motion recognition and tracking, activity tracking, step counter, calorie counter, sleep monitoring; detection of the wear state of hearables (in-ear detection), determination of head orientation and head movement; logistics, parts tracking, energy management and energy-saving measurement, anticipatory maintenance; sensor data fusion.

Exemplary embodiments of the present invention are shown in the figures and are described in greater detail in the following description.

DETAILED DESCRIPTION OF EXAMPLE EMBODIMENTS

Figure 1A:
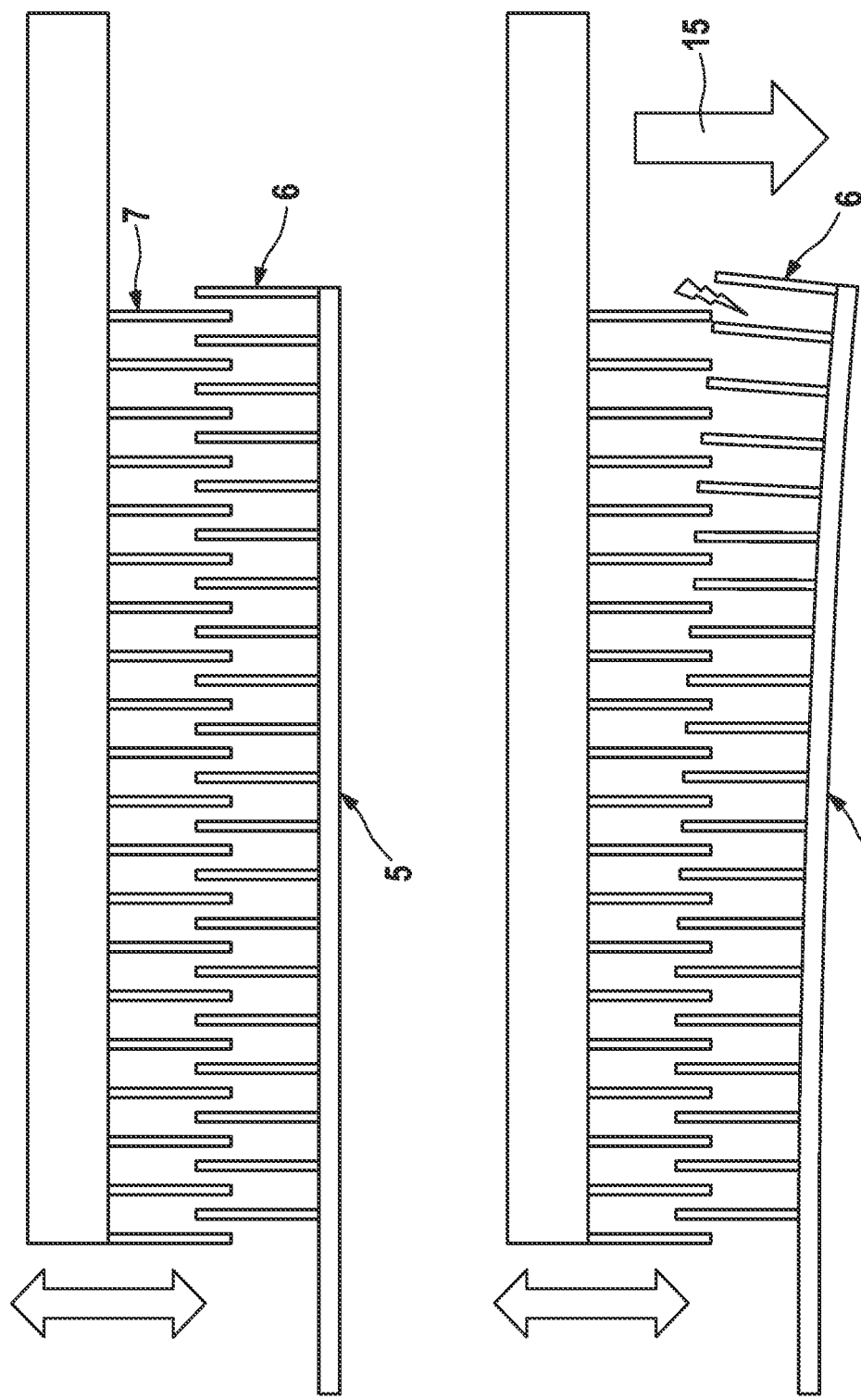
FIGS. 1A and 1B schematically illustrate the jamming of the drive comb.
Figure 1B:
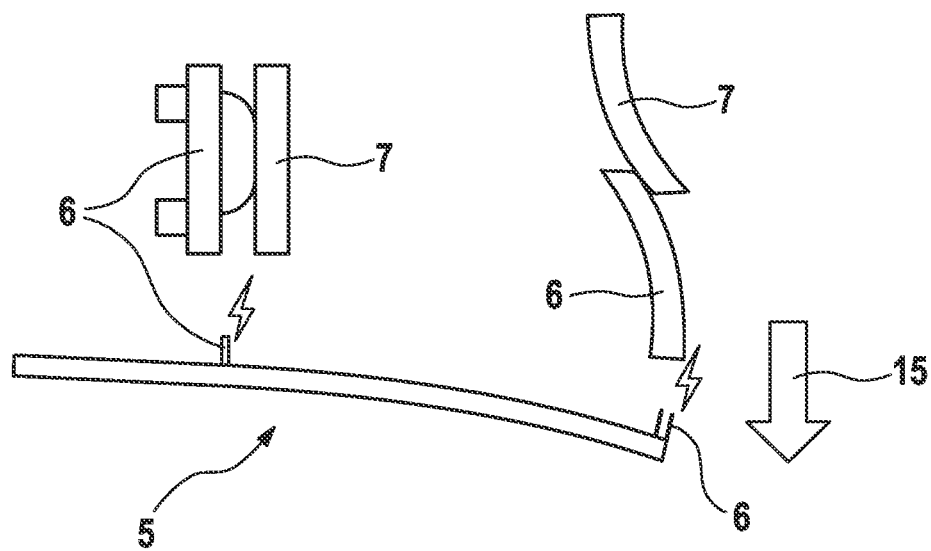

FIGS. 1A and 1B illustrate one specific aspect of the technical problem underlying the present invention. FIGS. 1a and 1b show different configurations of the drive structure for the seismic mass of a microelectromechanical rotation rate sensor 2 in which fingers 6 of a comb electrode 5 fixed to a substrate and fingers 7 of a comb electrode connected to the seismic mass in each case engage with one another. By applying a voltage between the two electrodes, an electrostatic force action arises, so that an oscillating force may be generated by a periodic voltage signal, by which the seismic mass is excited to carry out an oscillation.

When a mechanical shock acts on the system (indicated by arrow 15), as it arises, in particular, from a fall and an impact of the component, drive comb 5, as indicated in the illustration, is deflected and, in the process, may strike against an adjoining structure (such as, for example, fingers 7 of the opposing comb electrode) or become lodged or stuck ("jamming") thereon. As a result, drive comb 5 is blocked, and rotation rate sensor 2 is impaired in its functional capability. In principle, this "being stuck" is reversible, i.e., drive comb 6 may be released again by a further mechanical shock.

This effect may occur both in the excited state of the seismic mass and in its idle state. Jamming is a relevant problem for many applications since the corresponding devices (for example smart phones or wearables) are frequently dropped, and thus jamming may be triggered.

Figure 2A:
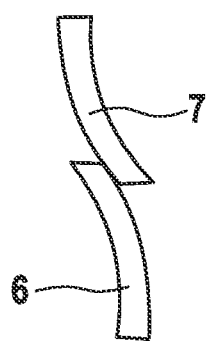
FIGS. 2A and 2B show the jamming of the drive comb with a deactivated drive and an activated drive.
Figure 2B:
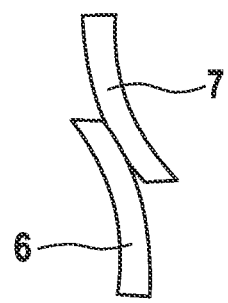

As is schematically illustrated by FIGS. 2A and 2B, in general a higher jamming rate is observed during sensor operation than in the switched-off state. In FIG. 2A, a jamming of electrode fingers 6, 7 is shown in this regard, as it may arise due to a shock of the idle structure, while electrode fingers 6, 7 from FIG. 2B were blocked by a superimposition of the electrostatically excited oscillation and an external shock. In the latter case, the freely oscillating drive fingers 7 and the fixed drive fingers 6 come considerably closer to one another than in the idle state, so that the overlap of fingers 6, 7 increases drastically. This results in a significant increase in the jamming probability, which is further intensified by the applied voltage and the electrostatic force action between fingers 6, 7 generated thereby.

Figure 3:
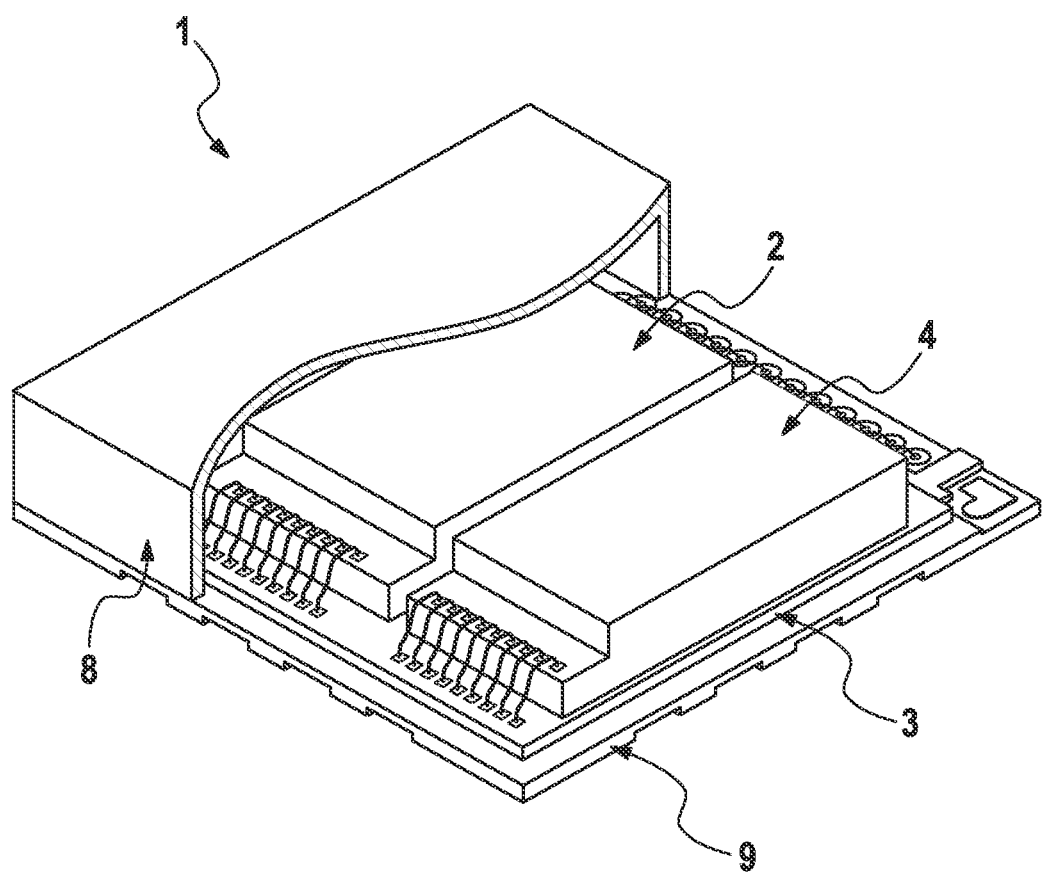
FIG. 3 shows a typical configuration of an inertial measuring unit.

FIG. 3 shows a typical configuration of a sensor system 1, designed as an inertial measuring unit, with the aid of which the basic features according to the present invention may be implemented by a corresponding design of the sensor control. The sensor system includes a substrate 9 on which an application-specific integrated circuit (ASIC) 3 is situated. On ASIC 3, in turn, a rotation rate sensor 2 and an acceleration sensor 4 are situated, which are surrounded by a housing 8 and in each case connected to ASIC 3 by bond wires. The two sensors 2, 4 may be controlled and their measured data be read out or further processed by ASIC 3, by which the signal chain shown in FIG. 4 may be implemented.

Figure 4:
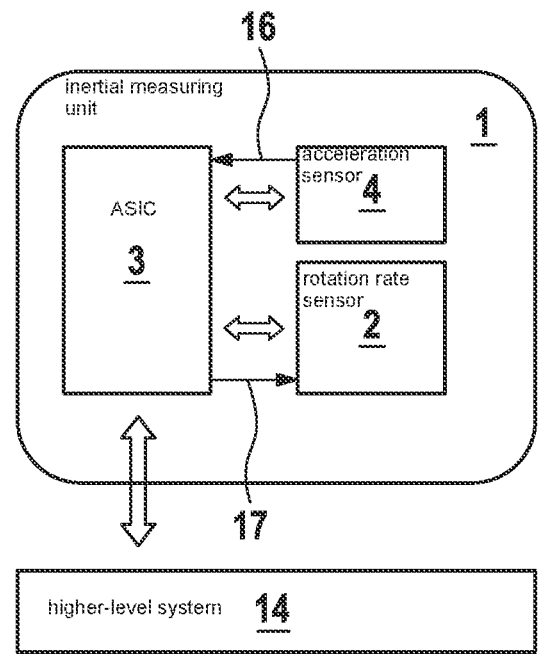
FIG. 4 shows the signal chain of one specific embodiment of the securing method according to the present invention.

FIG. 4 shows the signal exchange between components 2, 3, 4 of inertial measuring unit 1 from FIG. 3, as it underlies one specific embodiment of method 10 according to the present invention. The sequence of this process is controlled via ASIC 3, which is connected to higher-level system 14, which continuously reads out sensor data from system 1 during operation. In the shown specific embodiment of method 10, acceleration sensor 4 forwards measured data to ASIC 3 (arrow 16), which, in turn, recognizes a free fall via a drop in the measured acceleration values. When such a free fall is detected, rotation rate sensor 2 is activated (arrow 17) by ASIC 3 in such a way that the driving force for maintaining the oscillation of the seismic mass is deactivated. When the drive is shut off, the oscillation comes to a halt relatively quickly, so that the risk of a damage or blockage during impact is accordingly reduced.

Figure 5:
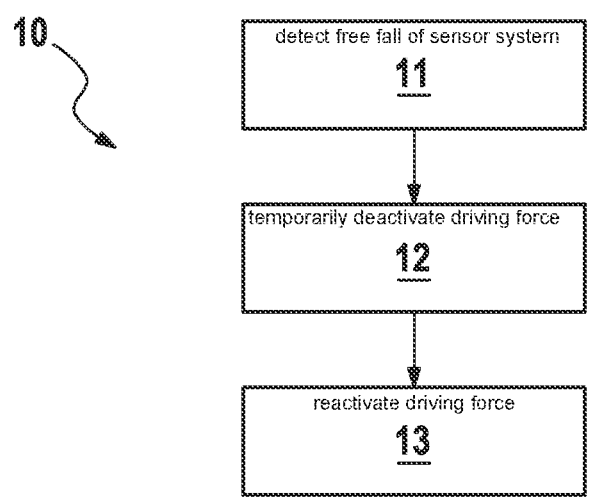
FIG. 5 schematically shows the sequence of one specific embodiment of the securing method according to the present invention.

FIG. 5 summarizes one specific embodiment of method 10 according to the present invention in a schematic diagram. Initially, a free fall of sensor system 1 is detected in detection step 11. In securing step 12 following detection step 11, the driving force is temporarily deactivated and thereafter reactivated in reactivation step 13.

What is claimed is:

1. A sensor system, comprising:
a rotation rate sensor including a seismic mass and being configured to drive a movement of the seismic mass using a driving force; and
a control unit, wherein the control unit is configured to detect a free fall of the sensor system and to deactivate the driving force in an event of a detection of the free fall,
wherein the rotation rate sensor includes an electrode array for generating the driving force,
wherein the control unit is configured to continuously monitor the sensor system for the free fall during a sensor operation,
wherein the driving force is deactivated by the control unit by shutting off a voltage present at the electrode array.

2. The sensor system as recited in claim 1, wherein the control unit is configured to actively inhibit the movement of the seismic mass in the event of the detection of the free fall.

3. The sensor system as recited in claim 1, wherein the sensor system includes a three-axis acceleration sensor, and the control unit is configured to detect the free fall of the sensor system as a function of a measuring signal of the acceleration sensor.

4. The sensor system as recited in claim 3, wherein the sensor system is an inertial measuring unit, and the control unit is formed by an application-specific integrated circuit of the inertial measuring unit.

5. The sensor system as recited in claim 3, wherein the control unit is configured to detect the free fall of the sensor system as a function of the measuring signal of the acceleration sensor and of a measuring signal of the rotation rate sensor.

6. The sensor system as recited in claim 1, wherein, the electrode array additionally being configured to generate a force for inhibiting the movement of the seismic mass.

7. A method for securing a sensor system, the sensor system including a rotation rate sensor including a seismic mass, and a control unit, an oscillation of the seismic mass being driven using a driving force, the method comprising the following steps:
in a detection step, detecting a free fall of the sensor system by the control unit; and
in a securing step following the detection step, deactivating the driving force in an event of a detection of the free fall by the control unit,
wherein the rotation rate sensor includes an electrode array for generating the driving force,
wherein the control unit is configured to continuously monitor the sensor system for the free fall during a sensor operation,
wherein the driving force is deactivated by the control unit by shutting off a voltage present at the electrode array.

8. The method as recited in claim 7, wherein the sensor system includes a three-axis acceleration sensor, and the free fall of the sensor system is detected by the control unit as a function of a measuring signal of the acceleration sensor.

9. The method as recited in claim 8, wherein an acceleration measured by the acceleration sensor is continuously compared to at least one threshold value, and the free fall is detected based on a drop of the measured acceleration below the threshold value.

10. The method as recited in claim 7, wherein the driving force is re-activated in a reactivation step following the securing step.

\* \* \* \* \*